United States Patent Office 3,386,986
Patented June 4, 1968

3,386,986
MONO AND DISAZO DYESTUFFS
Alfred Brack, Leverkusen, Germany, assignor to Farbenfabriken Bayer Aktiengesellschaft, Leverkusen, Germany, a corporation of Germany
No Drawing. Filed Mar. 27, 1964, Ser. No. 355,442
Claims priority, application Germany, Apr. 26, 1963, F 39,593
11 Claims. (Cl. 260—152)

The invention relates to valuable new azo dyestuffs; more particularly it relates to azo dyestuffs of the formula

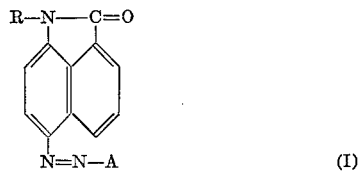     (I)

In this formula R means hydrogen, an alkyl aralkyl radical and A an aromatic-carbocyclic or -heterocyclic radical and the naphthalene ring, R and A may contain non-ionic substitutents; the dyestuffs shall be free of sulfonic acid and carboxylic acid groups.

The new azo dyestuffs may be obtained by treating compounds of the general formula

     (II)

or the derivatives of these compounds modified at the carboxylic acid group, wherein A has the meaning given above and the naphthalene ring and/or A may contain non-ionic substitutents, with condensing agents, and if, desired, (ar)alkylating the primary condensation products of the general formula

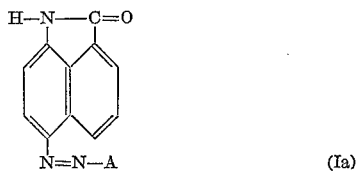     (Ia)

Suitable compounds of the general Formula II are for example 4-phenylazo-1-amino-8-naphthoic acid,
4-(4'-methylphenylazo)-amino-8-naphthoic acid,
4-4(4'-methoxyphenylazo)-1-amino-8-naphthoic acid,
4-(4'-acetaminophenylazo)-1-amino-8-naphthoic acid,
4-(4'-phenylazophenylazo)-1-amino-8-naphthoic acid,
4[4'-(4''-ethoxyphenylazo)-3',6'-diethoxyphenylazo]-1-amino-8-naphthoic acid,
4-[4'-(4''-chloro-phenylazo)-3'-methylphenylazo]-1-amino-8-naphthoic acid,
4-[pyridylazo-(2')]-1-amino-8-naphthoic acid,
4-[benzothiazolyazo-(2')]-1-amino-8-naphthoic acid,
4-[5'-nitrothiazolylazo-(2')]-1-amino-8-naphthoic acid,
4[5'-phenyl-thiadiazoly-(1',3',4'')-azo-(2')]-1-amino-8-naphthoic acid and
4-(triazolyl-(1',2',4')-azo-(3')]-1-amino-8-naphthoic acid.

These compounds are obtained in the usual manner by coupling diazonium salts with 1-amino-8-naphthoic acid.

Suitable condensing agents are for example organic or inorganic acids, such as formic acid, acetic acid, chloroacetic acid, tartaric acid, lactic acid, citric acid, hydrochloric acid, sulphuric acid and phosphoric acid, or acid halides, such as for example, acetyl chloride, phosphorus oxychloride, thionyl chloride and sulphuryl chloride, or acid anhydrides, for example acetic anhydride. Mixtures of agents of this kind can also be employed.

For carrying out the cyclisation, the compounds (II) are heated, for example, with the above-mentioned condensing agents in the presence or absence of diluents to temperatures between 40° C. and 160° C., preferably between 80° and 130° C. As diluents for condensation with acids, there can be used, for example, water, methanol, ethanol, dimethyl formamide, tetrahydrofuran, dioxan, ethylene glycol, ethylene glycol monomethyl ether, diethylene glycol and diethylene glycol dimethyl ether; suitable diluents for condensation with acid chlorides and anhydrides are, for example, chlorobenzene, dichlorobenzene and nitrobenzene.

The alkylation of the compounds (Ia) can be effected by treatment with agents splitting off a proton together with alkylating agents. As agents splitting off a proton there are suited, for example, alkali metal and alkaline earth metal hydrodixes, alcoholates, amides and hydrides, such as sodium hydroxide, potassium hydroxide, sodium methylate, sodium ethylate, sodium isoamylate, sodium-n-amylate, sodium-tert.-butylate, potassium ethylate, sodium amide, potassium amide, sodium hydride, calcium methylate and barium hydroxide. Suitable alkylating agents are, for example, dimethyl sulphate, diethyl sulphate, methyl-chloride, -bromide, -iodide, p-toluene-sulphonic acid methyl ester, ethyl bromide, N-ethyl-N-2'-chloroethyl aniline, chloroacetic acid ethyl ester, phenyl-2'-chloroethyl sulphone and allyl bromide. The alkylation is expediently carried out in a solvent or diluent, such as for example methanol, ethanol, n-butanol, isoamyl alcohol, dioxan and dimethyl formamide.

The new azo dyestuffs are suitable for the dyeing, printing and dyeing in the mass of materials which consist completely or preponderantly of aromatic linear polyesters, such as polyethyiene glycol terephthalate and aromatic polyesters from terephthalic acid and 1,4-bis-hydroxymethyl-cyclohexane, of synthetic polyamides, cellulose esters, polyurethanes, polystyrene and polyolefines. The dyeings and prints are distinguished by outstanding fastness properties, especially by excellent fastness to light, sublimation, wet processing and decatizing. The dyestuffs are thermally very stable and suited for dyeing at temperatures above 100° C.

In the following examples, which are given for the purpose of illustrating the invention, without, however, restricting it thereto, the parts are parts by weight and the degrees of temperature are degrees centigrade.

EXAMPLE 1

300 parts of the compound of the formula

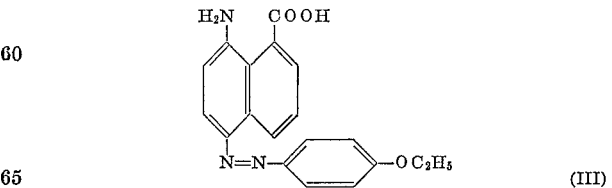     (III)

or the corresponding quantity of the sodium salt of this compound, and 1500 parts of glacial acetic acid are heated, whilst stirring, for 30 minutes to 90–100°. The cyclisation which begins at about 65° can be recognised by the brightening of the colour to reddish yellow. Upon cooling, the dyestuff of the formula

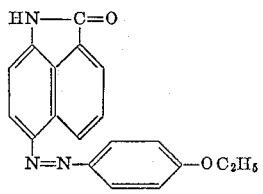

(IV)

separates. The yield is very good. The dyestuff gives from an aqueous dispersion on polyamide and acetylcellulose fibres intensely reddish yellow dyeings or prints which are fast to light.

The starting product (III) was prepared as follows:

75 parts of the sodium salt of 1-amino-naphthoic acid-(8) are dissolved in 500 parts of water and 130 parts of concentrated sodium hydroxide solution are added. A diazonium salt solution prepared in the usual manner from 46 parts of p-phenetidine, 400 parts of water, 120 parts of concentrated hydrochloric acid and 23 parts of sodium nitrite, is allowed to run in at room temperature, whilst stirring, and the mixture is stirred for a further 5–10 minutes at room temperature. The resulting golden yellow suspension of the sodium salt can be converted into a suspension of the free acid by addition of 130–150 parts of concentrated hydrochloric acid. After filtering off with suction and drying, the starting product is obtained in nearly quantitative yield.

EXAMPLE 2

100 parts of the compound (III) used in Example 1 are introduced portionwise into a boiling mixture of 1200 parts of water and 350–400 parts of concentrated hydrochloric acid. The mixture is kept boiling for 15 to 20 minutes, allowed to cool and the separated dyestuff (IV) of Example 1 isolated.

EXAMPLE 3

10 parts of the compound (III) used in Example 1 are heated with 100 to 150 parts of 1,2-dichlorobenzene to 110° and treated dropwise, whilst stirring, with 10 parts of phosphorus oxychloride. After the mixture has been heated at 100–110° for one hour, the excess phosphorus oxychloride is decomposed with water and the dichlorobenzene distilled off with steam. The dyestuff (IV) of Example 1 is obtained.

EXAMPLE 4

180 parts of the compound of the formula

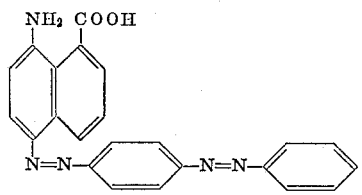

which had been prepared in analogy with the starting product of Example 1, are introduced portionwise, whilst stirring, into a boiling mixture of 3000 parts of water and 350 parts of concentrated hydrochloric acid. After boiling for about 15 minutes, the suspension is allowed to cool and filtered off with suction. The dyestuff of formula

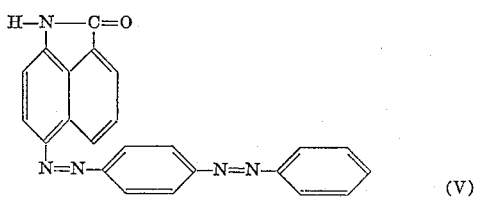

(V)

which can, if desired, be purified by recrystallising from dimethyl formamide, is obtained in almost quantitative yield. The dyestuff dyes polyester and polyamide materials golden-yellow, with excellent fastness properties.

EXAMPLE 5

40 parts of the compound of the formula

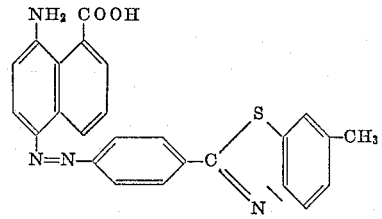

and 500 parts of 90% acetic acid are heated at the boil for 45 minutes. Upon cooling, the dyestuff of the formula

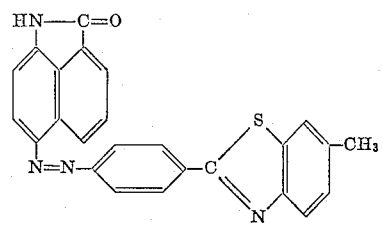

separates, which dyes polyamide fibres an intensely reddish yellow.

EXAMPLE 6

50 parts of the compound of the formula

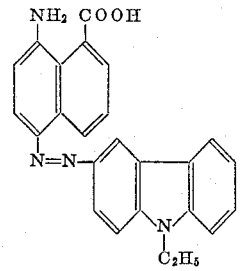

are heated for one hour at 90° with a mixture of 250 parts of dioxan, 100 parts of water and 50 parts of concentrated sulphuric acid. 1000 parts of water are then added and the product is filtered off with suction. The dyestuff of the formula

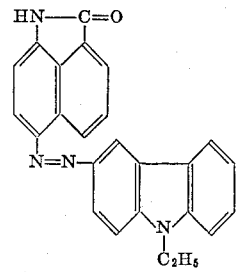

is obtained which dyes polyamide materials yellow-orange with excellent fastness properties.

EXAMPLE 7

A solution of 64 parts of the dyestuff (IV) of Example 1 in 1000 parts of dioxan is allowed to run into a solution of 6 parts of sodium in 200 parts of ethanol, 30 parts of dimethyl sulphate are then added and the mixture is heated at the boil for 30 minutes. 750–800 parts of the solvent mixture are then distilled off in the course of about 2 hours, whereby a bath temperature of 160° should not be exceeded. The cooled residue is stirred with 1000 to 2000 parts of water and filtered off with suction. The dyestuff of the formula

[Structure: naphthalene ring system with CH₃—N—C=O group and N=N—C₆H₄—OC₂H₅ substituent]

is obtained immediately in pure form. Acetonitrile is suitable for recrystallizing.

If the equivalent quantity of diethyl sulphate is used instead of dimethyl sulphate, the dyestuff of the formula

[Structure: naphthalene ring system with H₅C₂—N—C=O group and N=N—C₆H₄—OC₂H₅ substituent]

is obtained by the otherwise unchanged working method. Both dyestuffs dye polyester and polyamide materials yellowish orange with outstanding fastness properties.

EXAMPLE 8

A solution of 12 parts of sodium in 250 parts of ethanol is diluted with 1000 parts of dioxan. 158.5 of the dyestuff (IV) of Example 1 are added, the mixture is stirred for 10 minutes at 30–35°, 105 parts of N-n-butyl-N-2'-chloroethyl aniline are added, a sufficient amount of the solvent mixture is distilled off that a boiling point of 100° (under normal pressure) is obtained. After boiling for one hour, the residual solvent is distilled off and the residue stirred with 1000 parts of water at 90–95°. A viscous orange-yellow oil is obtained which solidifies when drying. Recrystallisation from cyclohexane yields a dyestuff of the formula

[Structure: phenyl—N(CH₂CH₂CH₂CH₃)—CH₂—CH₂—N—C=O attached to naphthalene with N=N—C₆H₄—OC₂H₅]

in crystalline form. The dyestuff is suitable for the dyeing of polyamides, polyethylene, polypropylene and polystyrene in intensely reddish yellow shades.

EXAMPLE 9

15 parts of dimethyl sulphate are added at room temperature to a mixture of 37.7 parts of the dyestuff (V) of Example 4, 500 parts of dimethyl formamide and 6 parts of sodium methylate. The mixture is heated in the course of about one hour to 120°, whilst the methanol formed is distilled off, stirred at this temperature for 2 hours, 300–400 parts of the solvent are then distilled off under reduced pressure, and the residue is stirred with 1000 parts of water. The precipitated dyestuff of the formula

[Structure: naphthalene ring system with CH₃—N—C=O group and N=N—C₆H₄—N=N—C₆H₅ substituent]

can be purified by recrystallisation from dioxan and dyes materials of polyamides and polyesters, for example polyethylene glycol terephthalate, yellow-orange with excellent fastness properties.

EXAMPLE 10

A dye liquor containing:

0.2 part of the dyestuff obtainable according to Example 9 in dispersed form, 2.6 parts of o-phenylphenol or an equivalent quantity of another dyeing accelerator, such as for example salicylic acid or cresotic acid ester, or of a chlorinated benzene hydrocarbon, and 400 parts of water is adjusted with sulphuric acid to a pH value of 4–5. Into this bath 10 parts of polyethyleneglycol terephthalate fibres are introduced at about 40°, the bath is heated to the boil within about 30 minutes whilst the fibres are moved about and maintained at boiling temperature for one hour. After rinsing and drying, a yellow-orange dyeing is obtained which is excellently fast to light, wet processing and sublimation.

EXAMPLE 11

0.2 part of the well dispersed dyestuff (IV) of Example 1 are stirred with 2 parts of water. 2–3 parts of one of the dyeing accelerators mentioned in Example 10 are added, the bath is diluted with 400 parts of water and adjusted to a pH value of between 4.5 and 5 by addition of formic acid. 10 parts of cellulose triacetate fibres are introduced at about 50°, the temperature is raised to at least 98° within about 20 minutes and the bath maintained for 1 to 1½ hours at 98° to boiling temperature. After rinsing and drying, an intensely reddish yellow dyeing is obtained, which is excellently fast to light, washing and exhaust gas.

EXAMPLE 12

Into a dyebath, consisting of 0.2 part of the dispersed dyestuff of Example 6, 300 part of water and 2.0 parts of high-molecular alkyl-sulphonates in form of their sodium salts, there are introduced at 50° 10 parts of fibres or of a fabric of polymeric ε-caprolactam, the temperature of the bath is increased to 98–100° in the course of about 15 minutes and the bath kept at this temperature for 1 hour, whilst the material to be dyed is moved about. After rinsing and drying, a yellow-orange dyeing with excellent fastness properties is obtained.

EXAMPLE 13

Into a dyebath consisting of 0.2 part of one of the dyestuffs formulated in Example 7 in dispersed form, 400 parts of water and 1.2 parts of Marseilles soap, there are introduced at 40–50° 10 parts of acetate rayon and the bath temperature is raised to 70–75° in the course of 15–20 minutes. Dyeing is carried out at this temperature for about one hour and an excellently fast, very intensely reddish yellow dyeing is obtained.

EXAMPLE 14

15.9 parts of the dyestuff (IV) described in Example 1 are added to a solution of 1,2 parts of sodium in 80 parts of ethyl alcohol at a temperature of about 30° C.; the mixture is stirred for about 5 minutes and 7 parts of benzylchloride are added thereto. The mixture is heated at the boil for 5 to 6 hours, the alcohol is almost completely distilled off and the residue stirred with water. The dyestuff of the formula (VI) thus obtained can be recrystallized from acetonitrile; it dyes materials of superpolyamides or aromatic polyesters reddish yellow shades with very good fastness properties.

If instead of benzylchloride the equivalent amount of 4-methyl-, 4-methoxy-, 4-ethoxy- or 4-phenoxy-benzylchloride is used, the dyestuffs (VII)–(X) are obtained under otherwise same working conditions which likewise dye the said materials reddish yellow shades with very good fastness properties.

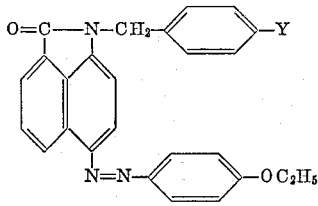

VI: Y=H
VII: Y=CH$_3$
VIII: Y=OCH$_3$
IX: Y=OC$_2$H$_5$
X: Y=OC$_6$H$_5$

EXAMPLE 15

A mixture of 75 parts of n-butanol, 3 parts of sodium hydroxide and 15,9 parts of the dyestuff (IV) are stirred for about 15 minutes at a temperature of 30 to 35° and 7 parts of benzylchloride are added thereto. The mixture is heated to the boil in the course of one hour and kept boiling for two hours. The butanol is then distilled off under reduced pressure and the dyestuff VI of Example 14 separated.

EXAMPLE 16

Into a solution of 1.2 parts of sodium in 100 parts of isoamyl alcohol there are first introduced 15.9 parts of the dyestuff (IV) at a temperature of 30 to 40°, then 8.6 parts of 4-nitrobenzyl chloride and the mixture is heated to the boil. After boiling for two hours the isoamyl alcohol is distilled off under reduced pressure (15–20 mm. Hg). The residue is stirred with 150 parts of water. The dyestuff of the formula (XI) is obtained which can be purified by recrystallization from dioxan.

If instead of 4-nitrobenzyl chloride the equivalent amount of 4-chloro-, 3,4-dichloro- or 4-phenyl-benzylchloride is used and the reaction is otherwise carried out as described above, the dyestuffs (XII)–(XIV) are obtained. The dyestuffs (XI)–(XIV) are suitable for the dyeing and printing of fibres and fabrics of superpolyamides and aromatic polyesters in excellently fast reddish yellow shades.

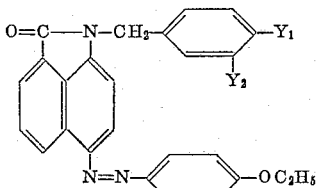

XI: Y$_1$=NO$_2$, Y$_2$=H
XII: Y$_1$=Cl, Y$_2$=H
XIII: Y$_1$=Cl, Y$_2$=Cl
XIV: Y$_1$=C$_6$H$_5$, Y$_2$=H

EXAMPLE 17

A mixture of 68 parts of sodium ethylate, 1500 parts of dioxan, 317 parts of the dyestuff (IV) and 123 parts of monochloro acetic acid ethyl ester is boiled for 2 to 3 hours with stirring. The solvent is distilled off, the residue stirred with 1000 to 2000 parts of water, filtered off with suction and dried. The dyestuff (XV) is obtained which can be purified by recrystallisation from acetonitrile and dyes materials of superpolyamides or aromatic polyesters fast reddish yellow shades.

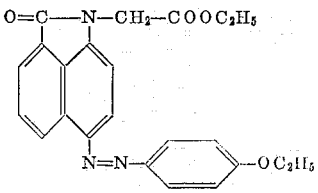

(XV)

EXAMPLE 18

220 parts of 6 percent alcoholic potash lye are stirred with 31 parts of the dyestuff (XVI)

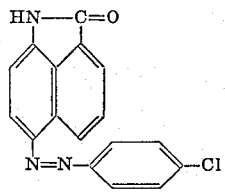

(XVI)

for 5 to 10 minutes at about 30°. Then 14.5 parts of the hydrochloride of 2-dimethylamino ethylchloride are added and the mixture is kept boiling for 4 to 5 hours. Working up is carried out as described in Example 14 and the dyestuff of the formula (XVII) is obtained. If instead of the hydrochloride of 2-dimethylamino ethylchloride the equivalent amount of the hydrochloride of 2-diethylamino ethylchloride is used the dyestuff (XVIII) is obtained. Both dyestuffs are suitable for the dyeing and printing of superpolyamide fibres and fabrics in fast reddish yellow shades.

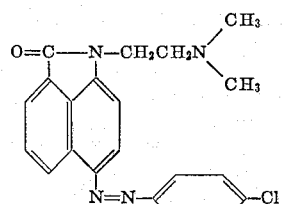

(XVII)

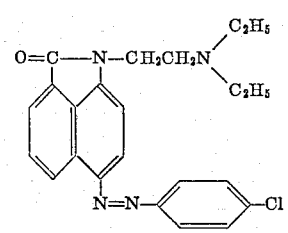

(XVIII)

The dyestuff (XVI) is obtained in analogous working manner as in Example 1 but using in place of p-phenetidine the equivalent amount of 4-chloroaniline.

EXAMPLE 19

24 parts of the compound of the formula

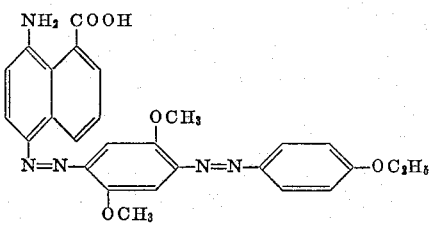

which had been prepared in the same manner as described in Example 1 are heated at the boil whilst stirring with 350 parts of 2 N hydrochloric acid for 15 to 30 minutes. The dyestuff of the Formula XIX

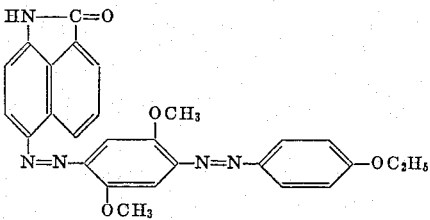

(XIX)

is obtained which dyes superpolyamides and aromatic polyesters red shades having very good fastness properties.

The dyestuff (XIX) can be methylated as described in Example 7. The dyestuff (XX) is obtained which dyes materials of polyamides and polyesters red shades which possess very good fastness properties.

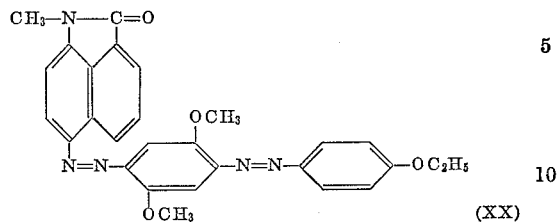

(XX)

The following dyestuffs are obtainable according to processes analogous to those described in the foregoing working examples, using the corresponding starting products. The dyestuffs dye superpolyamide fibres the shades listed below.

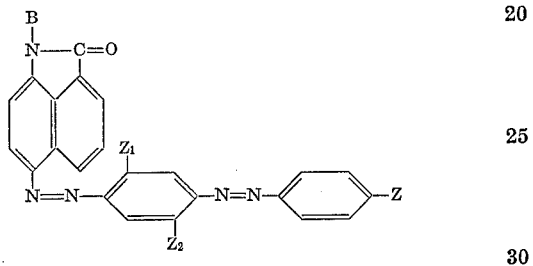

| B | $Z_1$ | $Z_2$ | Z | Shade on polyamide fibres |
|---|---|---|---|---|
| H | $OC_2H_5$ | $OC_2H_5$ | $OC_2H_5$ | Red. |
| $CH_3$ | $OC_2H_5$ | $OC_2H_5$ | $OC_2H_5$ | Red. |
| $C_2H_5$ | $OC_2H_5$ | $OC_2H_5$ | $OC_2H_5$ | Red. |
| H | $CH_3$ | $CH_3$ | Cl | Yellowish orange. |
| $CH_3$ | $CH_3$ | $CH_3$ | Cl | Do. |
| $CH_3$ | H | $CH_3$ | H | Strong reddish yellow. |
| $CH_3$ | $CH_3$ | $CH_3$ | Br | Yellowish orange. |
| $CH_3$ | $CH_3$ | $CH_3$ | $OC_2H_5$ | Orange. |
| $CH_3$ | Cl | $CH_3$ | $CH_3$ | Reddish yellow. |

I claim:
1. An azo dyestuff which is free of sulfonic acid groups and carboxylic acid groups and which has the formula:

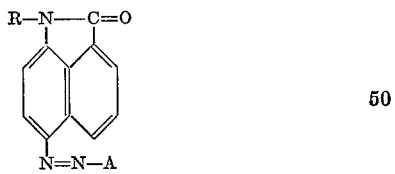

wherein R stands for a member selected from the class consisting of hydrogen, lower alkyl, allyl, lower alkoxy carboxy methyl, benzyl, methylbenzyl, methoxybenzyl, ethoxybenzyl, phenoxybenzyl, nitrobenzyl, chlorobenzyl, dichlorobenzyl, phenylbenzyl, dimethylaminoethyl, diethylaminoethyl, N-phenyl-N-ethylaminoethyl, N-phenyl-N-n-butylaminoethyl, and phenylsulfonyl-2-ethyl; and A stands for a radical selected from the group consisting of:

and

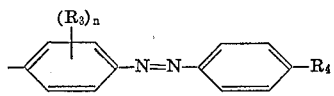

wherein $R_2$ is hydrogen, methyl, methoxy, ethoxy, chlorine, or acetamino; $R_3$ is hydrogen, methyl, methoxy or ethoxy; $R_4$ is hydrogen, chlorine, or ethoxy; and $n=1$ or 2.

2. The dyestuff of the formula

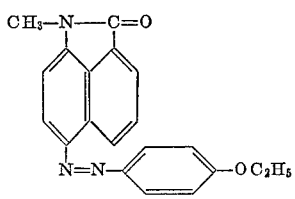

3. The dyestuff of the formula

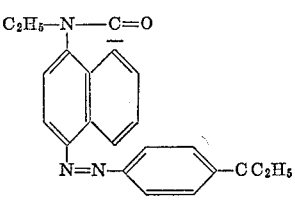

4. The dyestuff of the formula

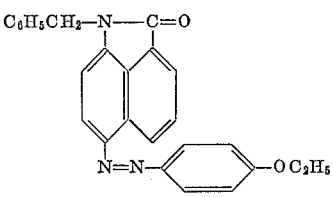

5. The dyestuff of the formula

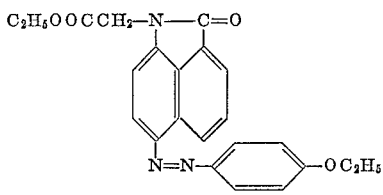

6. The dyestuff of the formula

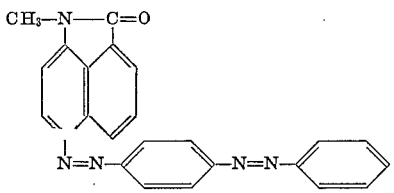

7. The dyestuff of the formula

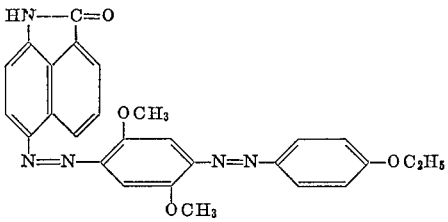

8. The dyestuff of the formula

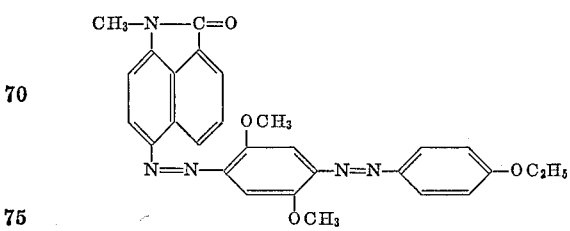

9. The dyestuff of the formula
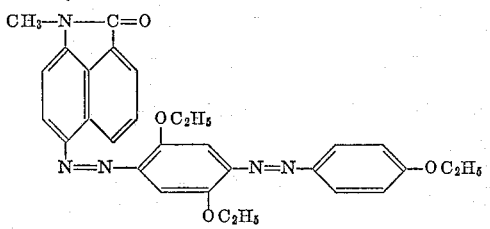
10. The dyestuff of the formula
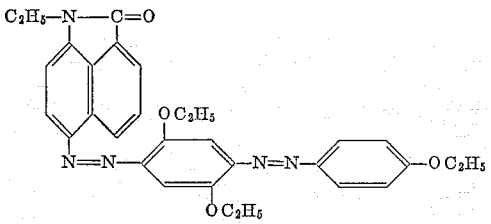
11. The dyestuff of the formula
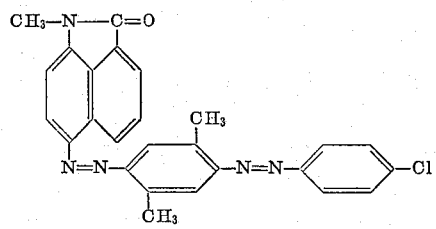
References Cited
UNITED STATES PATENTS
3,321,266   5/1967   Wunderlich et al. __ 260—158 X
CHARLES B. PARKER, *Primary Examiner.*
D. PAPUGA, *Assistant Examiner.*

UNITED STATES PATENT OFFICE
CERTIFICATE OF CORRECTION

Patent No. 3,386,986            June 4, 1968

Alfred Brack

It is certified that error appears in the above identified patent and that said Letters Patent are hereby corrected as shown below:

Column 1, line 20, "an aryl aralkyl" should read -- an alkyl or aralkyl --; line 52, "4-(4′-methylphenylazo)-amino-8-naphthoic acid" should read -- 4-(4′-methylphenylazo)-1-amino-8-naphthoic acid --; line 53, "4-4(4′-methoxyphenylazo)-1-amino-8-naphthoic acid" should read -- 4—(4′-methoxyphenylazo)-1-amino-8-naphthoic acid --; line 64, 4[5′-phenyl-thiadiazoly-(1′.3′,4″)" should read -- 4[5′-phenyl-thiadiozolyl-(1′,3′,4′) --; line 66, "4-(triazolyl-" should read -- 4-[triazolyl- --.
Column 2, line 25, "hydrodixes" should read -- hydroxides --.
Column 5, line 32, "158.5 of" should read -- 158.5 Parts of --.
Column 10, lines 13 to 20, the lower portion of the formula should appear as shown below:

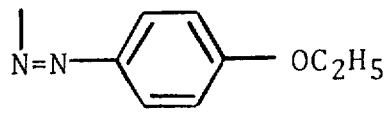

Signed and sealed this 25th day of November 1969.

(SEAL)
Attest:

EDWARD M. FLETCHER, JR.            WILLIAM E. SCHUYLER, JR.
Attesting Officer                      Commissioner of Patents